(12) United States Patent
Bost, Jr.

(10) Patent No.: US 8,037,573 B2
(45) Date of Patent: Oct. 18, 2011

(54) CURLED BUSHING WITH TORSIONAL SLIP

(75) Inventor: Robert J. Bost, Jr., Medina, OH (US)

(73) Assignee: The Pullman Company, Milan, OH (US)

( * ) Notice: Subject to any disclaimer, the term of this patent is extended or adjusted under 35 U.S.C. 154(b) by 440 days.

(21) Appl. No.: 12/061,798

(22) Filed: Apr. 3, 2008

(65) Prior Publication Data

US 2009/0249581 A1 Oct. 8, 2009

(51) Int. Cl.
*F16L 5/00* (2006.01)
*H02G 3/22* (2006.01)

(52) U.S. Cl. .............................................. 16/2.2; 16/2.1

(58) Field of Classification Search .................. 16/2.1, 16/2.2, 2.5; 403/132, 133, 135; 85/213; 248/608, 609; 174/650, 152 G, 153 G, 152 R, 174/142; 267/140.11, 140.12
See application file for complete search history.

(56) References Cited

U.S. PATENT DOCUMENTS

| | | | | |
|---|---|---|---|---|
| 2,606,795 A | * | 8/1952 | Hutton | 384/203 |
| 4,671,694 A | * | 6/1987 | Brenner et al. | 403/226 |
| 5,028,163 A | * | 7/1991 | Krieg et al. | 403/131 |
| 5,122,011 A | * | 6/1992 | Missig | 403/226 |
| 6,430,774 B1 | | 8/2002 | McLaughlin et al. | |
| 7,165,909 B2 | * | 1/2007 | Buhl et al. | 403/132 |
| 2002/0048485 A1 | * | 4/2002 | Garnier et al. | 403/135 |
| 2008/0008520 A1 | * | 1/2008 | Pal et al. | 403/133 |

FOREIGN PATENT DOCUMENTS

| | | | |
|---|---|---|---|
| JP | 01126415 A | * | 5/1989 |
| JP | 06-147228 | | 5/1994 |
| JP | 6-43382 | | 6/1997 |
| KR | 1999-0019737 | | 6/1999 |
| KR | 20-0228756 | | 7/2001 |
| WO | WO 2007/056123 | | 5/2007 |
| WO | WO 2008/031397 | | 3/2008 |

* cited by examiner

*Primary Examiner* — Victor Batson
*Assistant Examiner* — Jeffrey O Brien
(74) *Attorney, Agent, or Firm* — Harness, Dickey & Pierce, PLC

(57) ABSTRACT

An elastomeric bushing assembly has an inner component, an outer component and an elastomeric bushing disposed between the inner and outer components. A bearing engages the inner component and is disposed between the elastomeric bushing and the inner component. The bearing allows pivoting of the inner component with respect to the bearing. A low friction coating is disposed between the inner component and the bearing to provide a low friction interface.

18 Claims, 4 Drawing Sheets

US 8,037,573 B2

CURLED BUSHING WITH TORSIONAL SLIP

FIELD

The present disclosure relates to an elastomeric bushing which secures a component to a vehicle. More particularly, the present disclosure relates to an elastomeric bushing for attaching a component to a vehicle where the elastomeric bushing includes a torsional slip feature.

BACKGROUND

The statements in this section merely provide background information related to the present disclosure and may not constitute prior art.

Truck, bus and other heavy duty applications are commonly designed using an independent front and/or an independent rear suspension system to connect the chassis of the vehicle (the unsprung portion) and the body of the vehicle (the sprung portion). The independent suspension systems normally include an upper control arm, a lower control arm and a hub or knuckle which supports the tire of the vehicle. Each control arm is attached to the frame or other structural component of the vehicle using one or more elastomeric bushings. Each elastomeric bushing usually consists of an outer metal tube which is pressed into the control arm, a layer of elastomer positioned within the outer metal housing and an inner metal housing which extends through the center of the layer of elastomer. The inner metal housing is attached to a bracket on the frame, the supporting structure or the sprung portion of the vehicle or a bolt extends through the inner metal and secures the end of the control arm to the frame, the supporting structure or the sprung portion of the vehicle by mating with an appropriate bracket. As the vehicle travels, relative movement between the sprung and unsprung portions of the vehicle is accommodated by flexing of a coil spring, a torsion bar, an air spring or by another resilient device. The flexing of the resilient device causes the ends of the control arms to pivot on both of the pivot bushings which secure the control arms to the sprung portion of the vehicle.

The elastomeric bushings are used to facilitate this pivotal motion and to isolate the vehicle from shock. The layer of elastomer located between the inner and outer metal housings effectively isolates the sprung portion of the vehicle from the unsprung portion of the vehicle. In certain high load applications, the ends of the outer metal are curved or formed over towards the inner metal in order to further encapsulate the layer of elastomer. The curving or forming of the ends and thus the further encapsulating of the layer of elastomer improves the radial spring rate, it improves the axial spring rate, it improves the axial retention and it improves the durability of the bushing.

While these elastomer isolated pivot bushings have performed satisfactorily in the field, they are not without their problems. The various problems associated with these prior art pivot bushings include variations in the diameters of the control arms and distortion of the cross section in the area where the pivot bushing is pressed into the control arms. These manufacturing variations in the configuration of the control arms, often allow the bushing to slip out of the control arm when the control arm undergoes an axial load.

Also, in the higher load and the higher travel applications, the rotational angles that the pivot bushing must travel through places a detrimental effect on the life of the elastomeric component of the pivot bushing.

Thus, the continued development of pivot bushings has been directed to the improvements of rotational capabilities, the improvements of performance, the improvements of strength and the improvements of durability while minimizing the manufacturing costs associated with the pivot bushing.

SUMMARY

The present disclosure provides the art with a pivot bushing which provides the improved performance of the double-ended crimped bushings while increasing the rotational capabilities of the pivot bushing. The present disclosure includes a bearing component that is disposed between the inner metal and the elastomeric member to allow rotation of the inner metal with respect to the elastomeric member and the outer tubular member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 8:
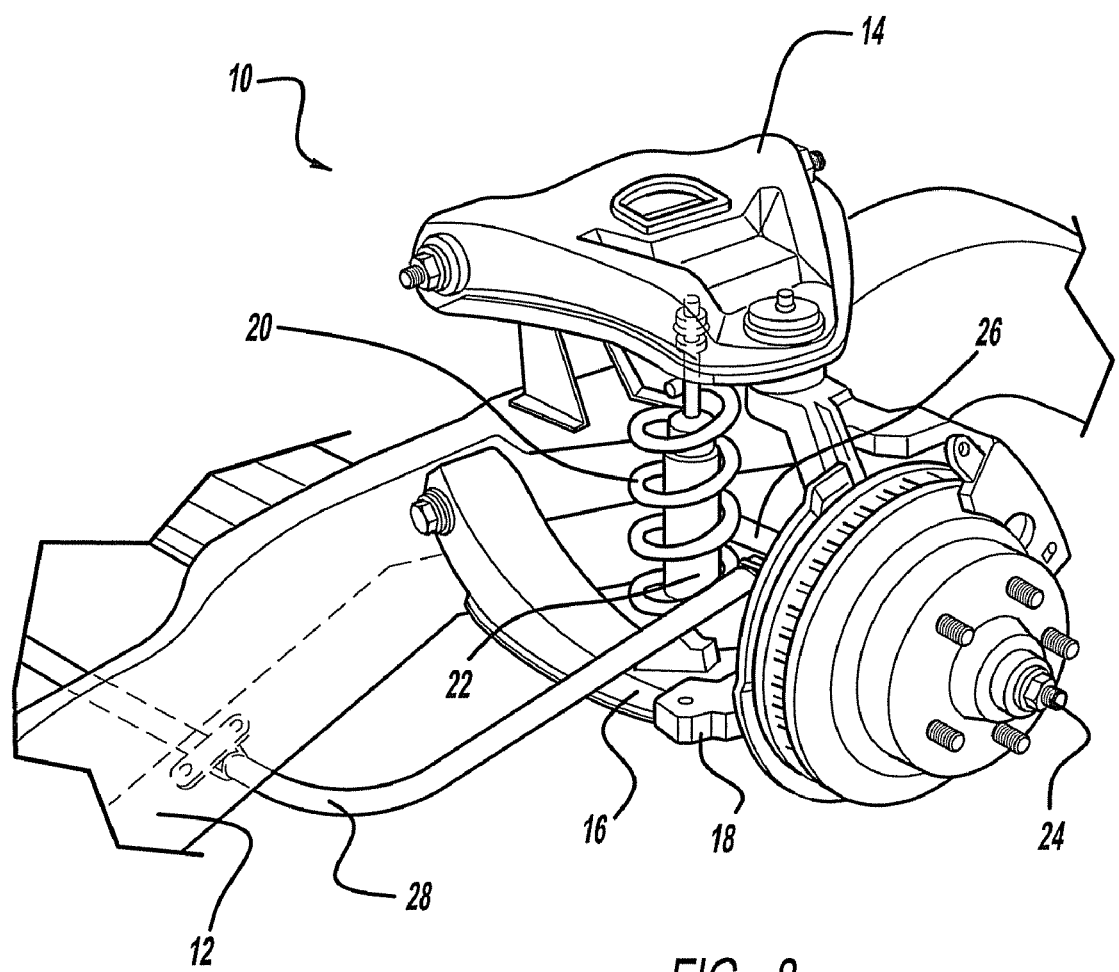
FIG. 8 is a typical suspension for a vehicle which incorporates the elastomeric bushing in accordance with the present disclosure.

Referring now to the drawings in which like reference numerals designate like or corresponding parts throughout the several views, there is illustrated in FIG. 8, a truck, bus or highly loaded suspension system incorporating the elastomeric bushing in accordance with the present disclosure and which is designated generally by reference numeral 10. Suspension system 10 comprises a frame or supporting structure of the vehicle 12, an upper control arm 14, a lower control arm 16, a hub or knuckle 18, a coil spring 20, a shock absorber 22 and a drive axle assembly 24. Frame or supporting structure 12 supports a body (not shown) and other components of the vehicle which are generally identified as the "sprung mass". Drive axle assembly 24 is attached to a differential or a transaxle (not shown) which receives torque from an engine (not show). Drive axle assembly 24 includes a pair of constant or non-constant velocity joints (not shown). One joint is attached to the differential and one joint is attached to hub or knuckle 18. A drive shaft 26 extends between the two joints. The engine transmits rotation and torque to the differential or transaxle which transfers the rotation and torque from the engine to hub or knuckle 18 through drive axle assembly 24. A wheel (not shown) attached to hub or knuckle 18 is driven by drive axle assembly 34 through hub or knuckle 18. The constant or non-constant velocity joints permit the transmission of torque at various angles which allows suspension system 10 to undergo jounce and rebound motions while still transmit torque from the differential or transaxle to the wheel of the vehicle.

Coil spring 20 supports the load for the sprung portion of the vehicle and shock absorber 22 dampens the movement of the wheel with respect to frame or supporting structure 12 as is well known in the art. A torque rod or anti-roll bar 28 can be disposed between frame or supporting structure 12 and hub or knuckle 18 to assist in the control of the wheel with respect to frame or supporting structure 12 as is well known in the art.

Figure 1:
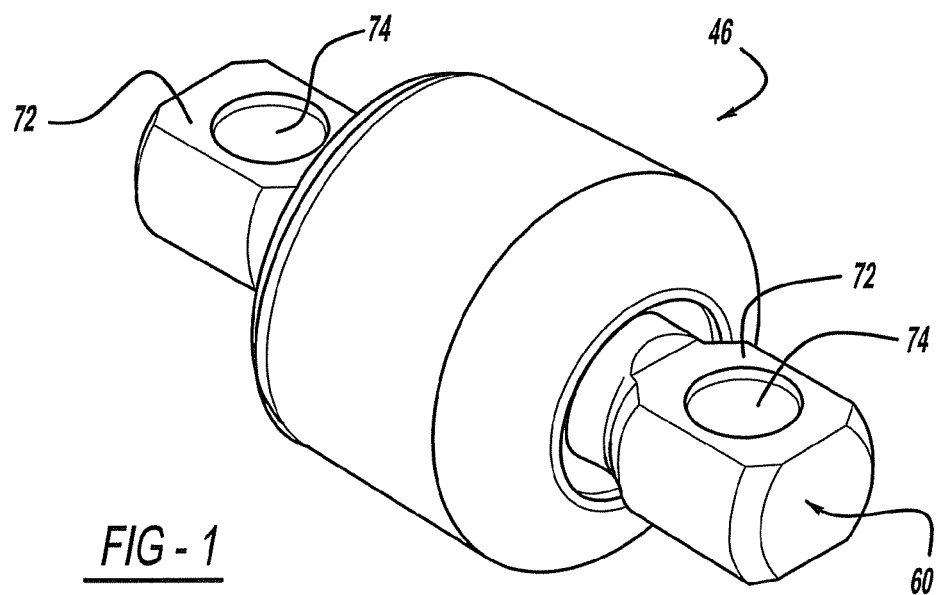
FIG. 1 is a perspective view of the elastomeric bushing in accordance with the present disclosure.
Figure 2:
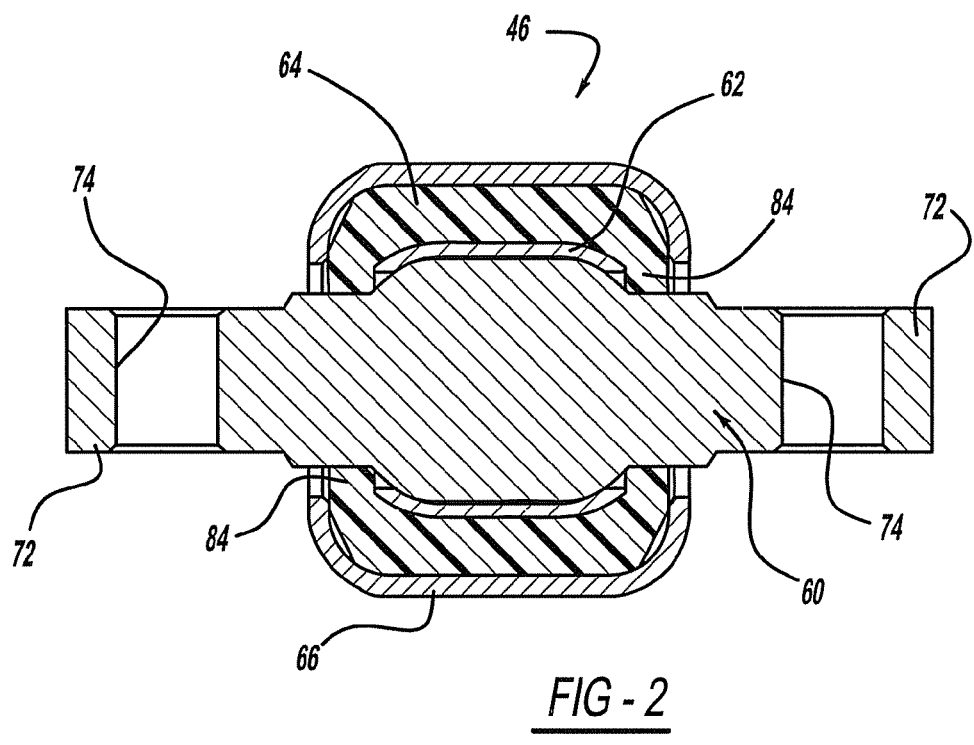
FIG. 2 is a cross-sectional view of the elastomeric bushing illustrated in FIG. 1.
Figure 3:
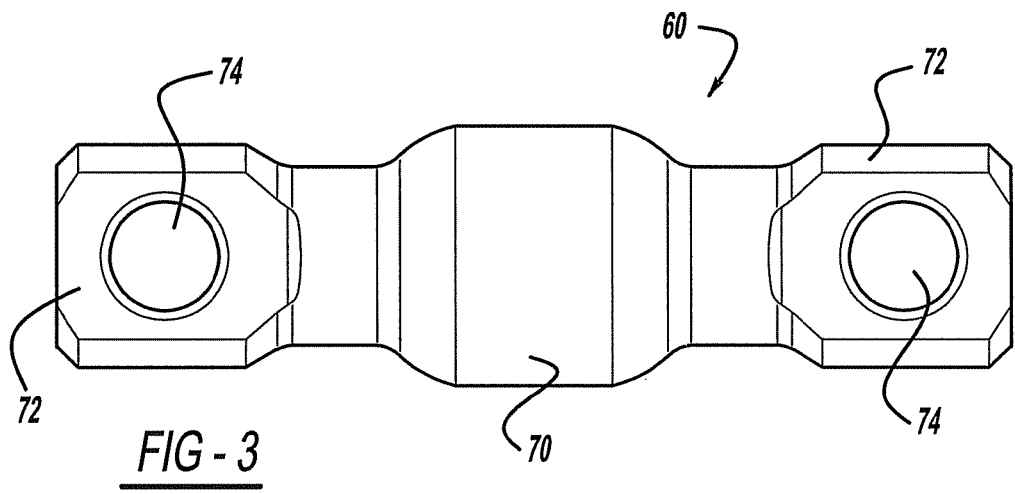
FIG. 3 is a side view of the inner metal illustrated in FIGS. 1 and 2.

Referring now to FIGS. 1, 2 and 8, upper control arm 14 and lower control arm 16 are each attached to frame or supporting structure 12 using a pair of elastomeric bushing assemblies 46. Each elastomeric bushing assembly 46 is disposed between control arms 14 and 16 and frame or supporting structure 12 to accommodate the motion between these two components and to isolate the sprung portion of the vehicle from shock.

While the present disclosure is being illustrated as having two elastomeric bushing assemblies 46 disposed between upper control arm 14 and 16 and frame or supporting structure 12 and one elastomeric bushing assembly 46 disposed between lower control arm 16 and frame or supporting structure 12, it is within the scope of the present disclosure to utilize elastomeric bushing assembly 46 between any two components that require one of the components to pivot with respect to the other component. In addition, while the present disclosure is being described as having three identical elastomeric bushing assemblies 46 disposed between control arms 14 and 16 and frame or supporting structure 12, it is within the scope of the present disclosure to utilize a different design for each elastomeric bushing assembly 46. Also, while the present disclosure is being illustrated in conjunction with an independent suspension system, it is within the scope of the present disclosure to utilize elastomeric bushing assembly 46 in other suspension designs including, but not limited to, leaf spring suspension systems.

Referring now to FIGS. 1-6, elastomeric bushing assembly 46 comprises an inner component 60, a tubular bearing 62, an elastomeric bushing 64, and an outer component 66. Inner component 60 is illustrated as a metal bar pin which includes a generally cylindrical center section 70 and a pair of generally rectangular sections 72, one generally rectangular section 72 being disposed at each end of cylindrical center section 70. Each generally cylindrical center section 70 has an aperture 74 extending through it which is used to secure elastomeric bushing assembly 46 to the appropriate bracket. While inner component 60 is illustrated as a bar pin having a generally cylindrical center section 70, it is within the scope of the present disclosure to have different inner components including but not limited to an inner component 160 illustrated in an elastomeric bushing assembly 146 illustrated in FIG. 7 having a generally spherical center section 170, a tubular inner component (not shown) or any other type of inner component known in the art. If a tubular inner component is used, typically a through bolt extending through the inner component is used to secure the pivot bushing to the vehicle.

Figure 4:
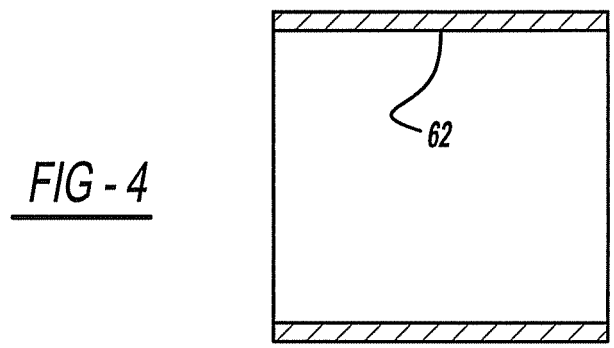
FIG. 4 is a side cross-sectional view of the bearing component illustrated in FIGS. 1 and 2.
Figure 5:
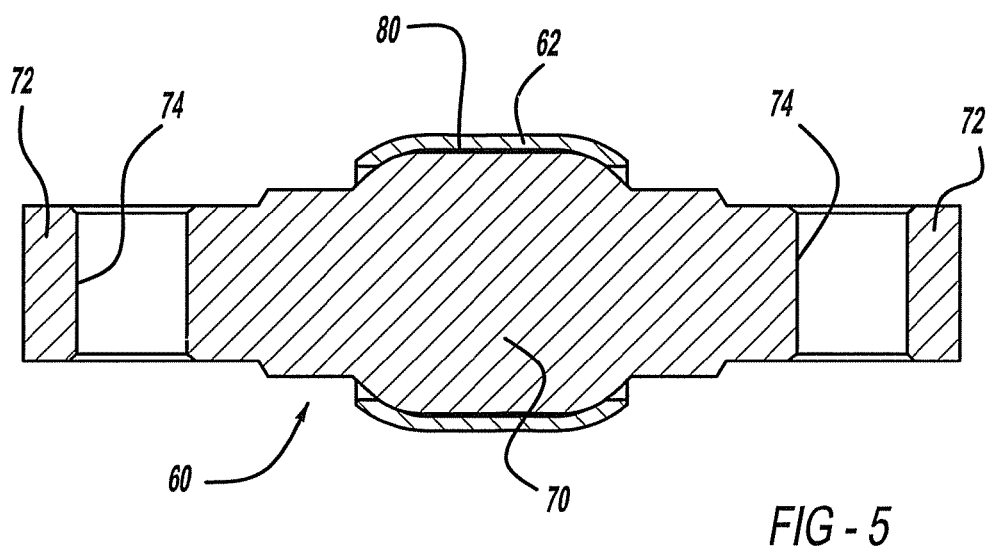
FIG. 5 is a side cross-sectional view of the assembly of the inner metal and the bearing component illustrated in FIGS. 1 and 2.
Figure 7:
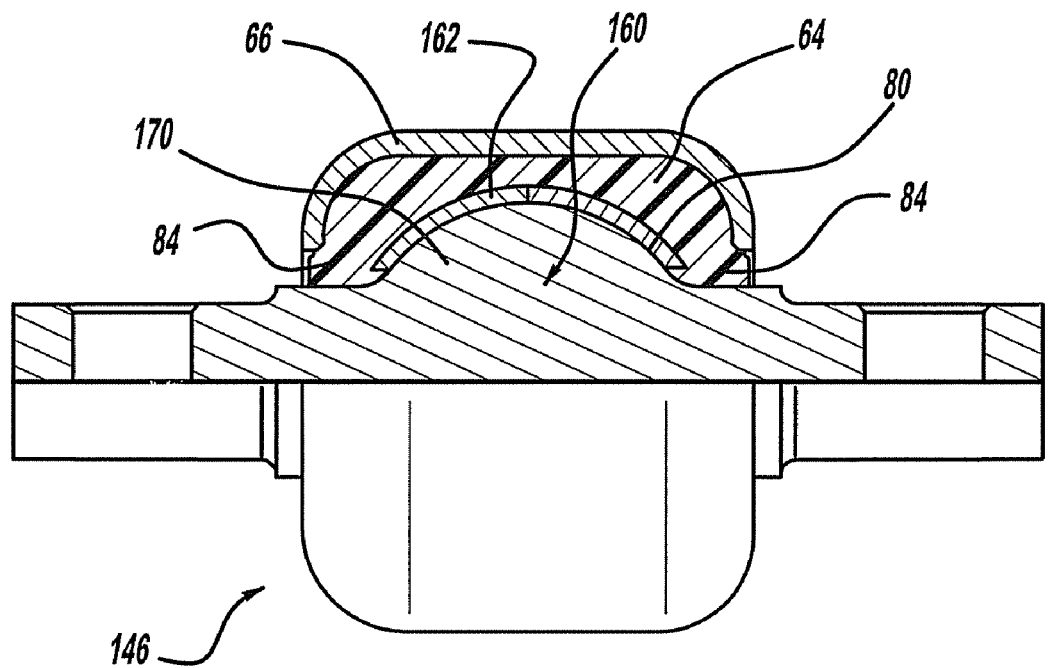
FIG. 7 is a side cross-sectional view of an elastomeric bushing in accordance with another embodiment of the present invention.

Tubular bearing 62 is a metal or plastic component formed as a generally tubular member as illustrated in FIG. 4. Tubular bearing 62 is assembled over generally cylindrical center section 70 and the ends of tubular bearing 62 are then formed or curled around cylindrical center section 70 as illustrated in FIG. 5. Prior to assembling tubular bearing 62 over generally cylindrical center section 70, generally cylindrical center section 70 is coated with a low friction abrasion resistant coating 80 which provides a low friction interface between generally cylindrical center section 70 and tubular bearing 62 to facilitate the movement of tubular bearing 62 with respect to cylindrical center section 70. As illustrated in FIG. 7, a tubular bearing 162 is formed into a spherical shape using two separate inserts to mate with generally spherical center section 170 of inner component 160. Low friction abrasion resistant coating 80 is disposed between generally spherical center section 170 and tubular bearing 162 to provide a low friction interface. While tubular bearing 162 is being illustrated using two separate inserts, it is within the scope of the present disclosure to use a single piece tubular bearing 162 and then to form the tubular bearing 162 into the spherical shape in a manner similar to tubular bearing 62 discussed above.

Elastomeric bushing 64 is an elastomeric annular member which is located between tubular bearing 62 and outer component 66. The free diameter of elastomeric bushing 64 is larger than the space between tubular bearing 62 or tubular bearing 162 and outer component 66 such that a specified percent compression is applied to elastomeric bushing 64 when it is assembled into elastomeric bushing assembly 46 or elastomeric bushing assembly 146. The assembly of elastomeric bushing 64 is accomplished by first bonding elastomeric bushing 64 to outer component 66 and then inserting the assembly of inner component 60 or inner component 160 and tubular bearing 62 or tubular bearing 162 into the center of elastomeric bushing 64. The compression of elastomeric bushing 64 during the assembly of inner component 60 or inner component 160 and tubular bearing 62 or tubular bearing 162 creates a mechanical bond between elastomeric bushing 64 and tubular bearing 62 or tubular bearing 162 which resists relative motion between the two. While elastomeric bushing 64 is described as being bonded to outer component 66, it is within the scope of the present disclosure to bond elastomeric bushing 64 to tubular bearing 62 or to tubular bearing 162 and rely on a mechanical bond between elastomeric bushing 64 and outer component 66; to bond elastomeric bushing 64 to both tubular bearing 62 or tubular bearing 162 and outer component 66; or to not bond elastomeric bushing to either component and rely on a mechanical bond between elastomeric bushing 64 and tubular bearing 62 or tubular bearing 162 and a mechanical bond between elastomeric bushing 64 and outer component 66 created by the compression of elastomeric bushing 64.

Figure 6:
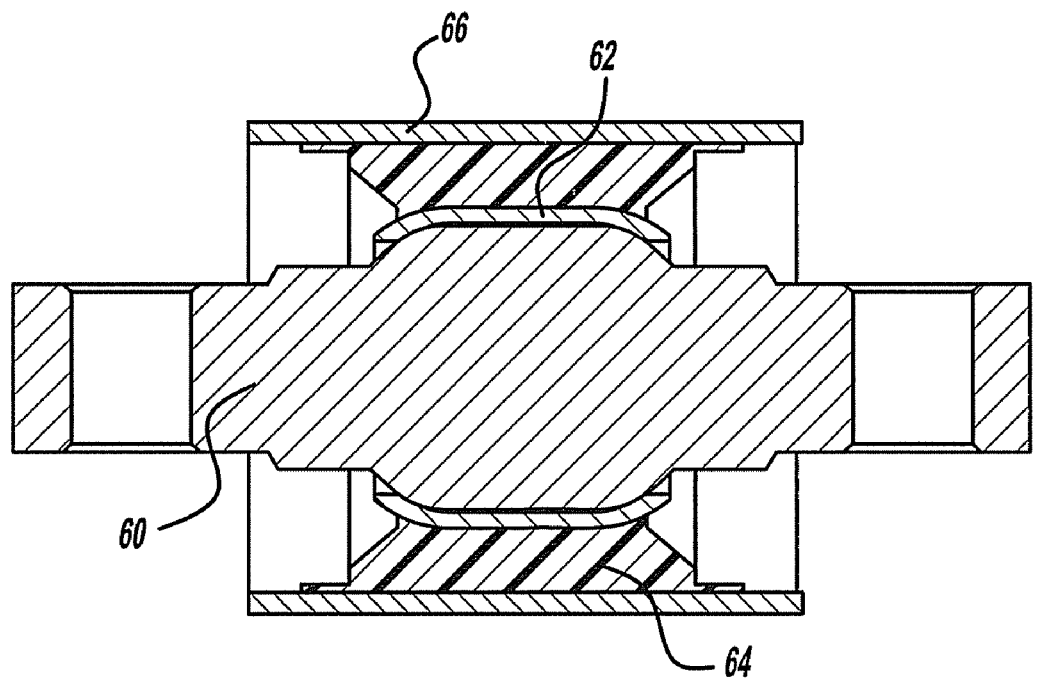
FIG. 6 is a side cross-sectional view of the assembly of the inner metal, the bearing component, the elastomeric member and the outer tube illustrated in FIGS. 1 and 2.

Outer component 66 is a metal cylindrical tube which is bonded to elastomeric bushing 64. Once the assembly of elastomeric bushing 64 and outer component 66 are assembled with inner component 60 and tubular bearing 62 as illustrated in FIG. 6, the ends of outer component 66 are formed or curled over elastomeric bushing 64 to encapsulate elastomeric bushing 64 as illustrated in FIG. 2.

Elastomeric bushing assembly 46 or elastomeric bushing assembly 146 can be utilized in any application where high load capacity and high angular capacity is required. The operation of elastomeric bushing assembly 46 or elastomeric bushing assembly 146 consist of a torsional moment being applied about the axis of inner component 60 or inner component 160. This moment in turn causes relative movement between the low friction coated inner component 60 or inner component 160 and tubular bearing 62 or tubular bearing 162. Tubular bearing 62 or tubular bearing 162 is held in place due to the mechanical bond between tubular bearing 62 or tubular bearing 162 and elastomeric bushing 64. Bulging portions 84 of elastomeric bushing 64 which occur during the compression of elastomeric bushing 64 during assembly of elastomeric bushing assembly 46 or elastomeric bushing assembly 146 provide a seal with inner component 60 or inner component 160 to prevent contaminant ingress which enhances the performance of tubular bearing 62 or tubular bearing 162.

Elastomeric bushing assembly 46 or elastomeric bushing assembly 146 provides the high load carrying capacity and isolation of a curled elastomeric bushing while allowing for high articulation angles. This provides a much more durable bushing in applications where high angular movement are present. An additional advantage for elastomeric bushing assembly 46 or elastomeric bushing assembly 146 is the incorporation of elastomeric seals in the form of bulging portions 84. Once outer component 66 has been formed or curled over elastomeric bushing 64, elastomeric bulging portions 84 seal against inner component 60 or inner component 160 providing an adequate seal against contaminants which protects tubular bearing 62 or tubular bearing 162.

What is claimed is:

1. A bushing assembly comprising:
   an inner component;
   an outer component disposed over said inner component, said outer component including a first curled end and a second curled end opposite to said first curled end;
   a single piece elastomeric bushing disposed between said inner component and said outer component, said entire single piece elastomeric bushing being disposed between an outer surface of said first curled end and an outer surface of said second curled end; and
   a bearing in engagement with said inner component and disposed between said inner component and said elastomeric bushing, said inner component being free to move with respect to said bearing; wherein
   said single piece elastomeric bushing forms bulging portions that seal against said inner component to seal the engagement between said bearing and said inner component.

2. The bushing assembly according to claim 1, further comprising a low friction coating disposed between said inner component and said bearing.

3. The bushing assembly according to claim 1, wherein said inner component defines a generally cylindrical center section, said bearing being formed around said generally cylindrical center section of said inner component.

4. The bushing assembly according to claim 3, further comprising a low friction coating disposed between said inner component and said bearing.

5. The bushing assembly according to claim 1, wherein said outer component is formed over said elastomeric bushing to encapsulate said elastomeric bushing.

6. The bushing assembly according to claim 1, wherein said inner component defines a generally spherical center section, said bearing being formed around said generally spherical center section of said inner component.

7. The bushing assembly according to claim 6, further comprising a low friction coating disposed between said inner component and said bearing.

8. The bushing assembly according to claim 6, wherein said outer component is formed over said elastomeric bushing to encapsulate said elastomeric bushing.

9. A bushing assembly comprising:
   an inner component;
   an outer component disposed over said inner component, said outer component including a first curled end and a second curled end opposite to said first curled end;
   a single piece elastomeric bushing disposed between said inner component and said outer component, said entire single piece elastomeric bushing being disposed between an outer surface of said first curled end and an outer surface of said second curled end; and
   a metal bearing in engagement with said inner component and disposed between Said inner component and said elastomeric bushing, said inner component being free to move with respect to said bearing; wherein
   said single piece elastomeric bushing forms bulging portions that seal against said inner component to seal the engagement between said metal bearing and said inner component.

10. The bushing assembly according to claim 9, further comprising a low friction coating disposed between said inner component and said metal bearing.

11. The bushing assembly according to claim 9, wherein said inner component defines a generally cylindrical center section, said metal bearing being formed around said generally cylindrical center section of said inner component.

12. The bushing assembly according to claim 9, wherein said outer component is formed over said elastomeric bushing to encapsulate said elastomeric bushing.

13. The bushing assembly according to claim 9, wherein said inner component defines a generally spherical center section, said metal bearing being formed around said generally spherical center section of said inner component.

14. A bushing assembly comprising:
    an inner component;
    an outer component disposed over said inner component, said outer component including a first curled end and a second curled end opposite to said first curled end;
    a single piece elastomeric bushing disposed between said inner component and said outer component, said entire single piece elastomeric bushing being disposed between an outer surface of said first curled end and an outer surface of said second curled end; and
    a non-rubber bearing in engagement with said inner component and disposed between said inner component and said elastomeric bushing, said inner component being free to move with respect to said bearing; wherein
    said single piece elastomeric bushing forms bulging portions that seal against said inner component to seal the engagement between said non-rubber bearing and said inner component.

15. The bushing assembly according to claim 14, further comprising a low friction coating disposed between said inner component and said non-rubber bearing.

16. The bushing assembly according to claim 14, wherein said inner component defines a generally cylindrical center section, said non-rubber bearing being formed around said generally cylindrical center section of said inner component.

17. The bushing assembly according to claim 14, wherein said outer component is formed over said elastomeric bushing to encapsulate said elastomeric bushing.

18. The bushing assembly according to claim 14, wherein said inner component defines a generally spherical center section, said non- rubber bearing being formed around said generally spherical center section of said inner component.

* * * * *